United States Patent [19]

Asano et al.

[11] Patent Number: 4,944,668
[45] Date of Patent: Jul. 31, 1990

[54] DEVICE FOR GRIPPING AND PULLING SOFTENED PLASTIC SHEET AT FRONT AND REAR EDGES TO BE MOLDINGLY FORMED

[75] Inventors: Kazuo Asano; Toshihiso Takai; Mitusuke Takito, all of Nagoya, Japan

[73] Assignee: Kabushiki Kaisha Asano Kenkyusho, Aichi, Japan

[21] Appl. No.: 301,771

[22] Filed: Jan. 26, 1989

[30] Foreign Application Priority Data

Feb. 24, 1988 [JP] Japan .................................. 63-41669

[51] Int. Cl.$^5$ ............................................ B29C 51/04
[52] U.S. Cl. .................................. 425/397; 264/291; 264/292; 264/319; 264/322; 425/403; 425/403.1
[58] Field of Search .................. 264/288.4, 291, 290.2, 264/319, 322, 292, 553; 425/383, 384, 400, 403, 403.1, DIG. 48, 397, 388; 38/102.91, 102.1; 26/71, 72, 89, 91, 94; 156/494, 495, 496

[56] References Cited

U.S. PATENT DOCUMENTS 3,466,706  9/1969  Asano ................................ 425/384
3,827,683  8/1974  Seborg et al. ........................ 425/397
4,555,377  11/1985  Whiteside et al. .................. 425/383

FOREIGN PATENT DOCUMENTS

161523  7/1987  Japan .

Primary Examiner—Jay H. Woo
Assistant Examiner—Timothy W. Heitbrink
Attorney, Agent, or Firm—Sughrue, Mion, Zinn, Macpeak & Seas

[57] ABSTRACT

A device for gripping and pulling a length of thermoplastic sheet softened to be moldingly formed at the front and rear edges, which are otherwise inevitably made to be concave, so as to hold edges substantially straight. The device uses at least two pairs of lower and upper gripping members arranged to be vertically movable so as to grip the above front and rear edges. Two pairs of pull levers each cooperating with one of the pair of lower and upper gripping members operate so as to grip the front and rear edges in advance of the gripping by the gripping members and pull to straighten the concaved edges which are then gripped by the gripping members.

6 Claims, 8 Drawing Sheets

DEVICE FOR GRIPPING AND PULLING SOFTENED PLASTIC SHEET AT FRONT AND REAR EDGES TO BE MOLDINGLY FORMED

BACKGROUND OF THE INVENTION AND RELATED ART

The present invention relates to a device for gripping and pulling a length of thermoplastic sheet softened to be moldingly formed at the front and rear edges. The edges which are otherwise inevitably made to be concave are held substantially straight.

Various articles such as bath tubs, refrigerator compartments and the like are formed by feeding a thermally softened plastic sheet having of a width and length necessary for forming the desired article between a pair of opposite dies separated with each other. Forming occurs by holding the opposite side edges thereof by means of a pair of endlessly driven cramp chains, and then engaging said upper and lower dies together.

The plastic sheet is in general continuously formed by a extruder having a slit nozzle of a desired gap and width, and cut in the necessary length. In either case where the cut sheets are directly fed from the extruder to a forming machine having dies or where the cut sheets once stored are successively supplied thereto e.g. from a pallet, they must be heated to be relevantly formed just in front of said dies.

The softened plastic sheet, which is seized by the pair of cramp chains at and along the opposite side edges to be fed to the forming machine, is inevitably dangled down in the longitudinal direction due to thermoplasticity and weight or gravity thereof, and shrinks more or less in the length thereof due to cooling during feed so that the originally straight front and rear edges of the sheet are made concave, which is more definitely illustrated later.

Not only does such dangling of the plastic sheet have adverse affects on relevant molding of the articles, but also such shrinkage in the lengthwise direction necessitates that the plastic sheet is cut longer so as to compensate for shrinkage, which results in material loss.

It is not always simple to grip the concave front and rear edges of the plastic sheet so as to suitably pull the edges to be substantially straight in the forming machine without disturbing the forming operation.

In JP-A Sho No. 62(1987)-161523, there is disclosed a device for gripping and pulling the concave front and rear edges of the softened plastic sheet comprising a pair of upper and lower clamp members adapted to move vertically apart for allowing the plastic sheet to be brought between the upper and lower dies and towards each other for holding the sheet at the rear edge therebetween with each other. Another pair of upper and lower clamp members are adapted to move vertically apart for allowing the article formed on the plastic sheet to be discharged out of the forming machine and towards each other for holding the sheet at the front edge therebetween with each other. Each of the two pairs of clamp members being mounted on a respective carriage adapted to longitudinally move for pulling the clamped edges rearwardly and forwardly.

This is not satisfactory, however, in that there must be provided two carriages to be longitudinally moved for pulling the softened plastic sheet in opposite directions in addition to the vertically movable clamp members, and independent therefrom so that it is difficult to actuate pulling timingly and with suitable force relative to clamping.

SUMMARY OF THE INVENTION

It is, thus, an object of the invention to provide a device of the art which can avoid and overcome said defects of the related known device.

Another object of the invention is to provide such device which is more compact and inexpensive.

Other objects and advantages thereof will be appreciated by those skilled in the art by carefully studying a description on the preferred embodiment of the invention to be given hereafter in reference to the accompanying drawings.

DESCRIPTION OF THE PREFERRED EMBODIMENT

Figure 9:
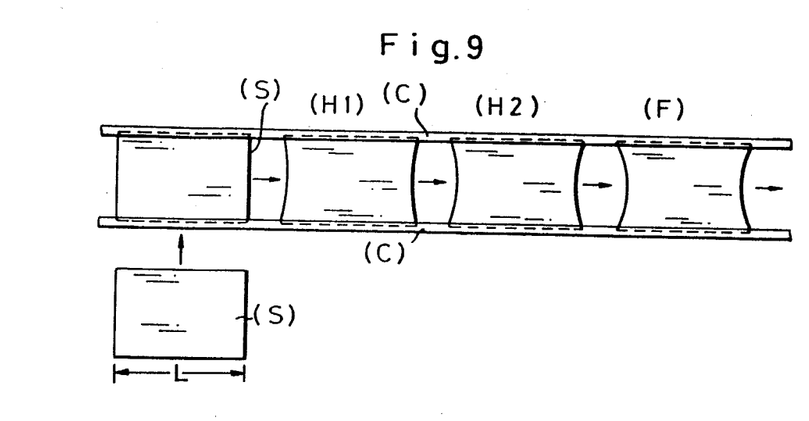
FIGS. 9 and 10 are similar views showing status of plastic sheets supplied, thermally softened and fed to the forming machine in case where the device of the invention is not used.

Firstly in reference to FIG. 9, a plurality of thermoplastic sheets (S) each cut in a length (L) is successively supplied e.g. from a pallet, not shown, so as to be held by a pair of endless clamp chains (C) at the opposite side edges thereof and carried thereby through a first preheating zone (H1) and a second heating zone (H2) to be moldingly formed in a forming zone (F). The straightly severed front and rear edges of the plastic sheet (S) are made to be concave in the preheating zone (H1) due to dangling and the concaveness is increased in the second heating zone (H2). Due to cool shrinkage of the length of the heated sheet which is held by the pair of clamp chains (C) along the side edges, this concaveness is further increased when the sheet is brought in the forming zone (F) so that the effective length thereof is reduced to (La), if there is taken no countermeasure.

Figure 10:
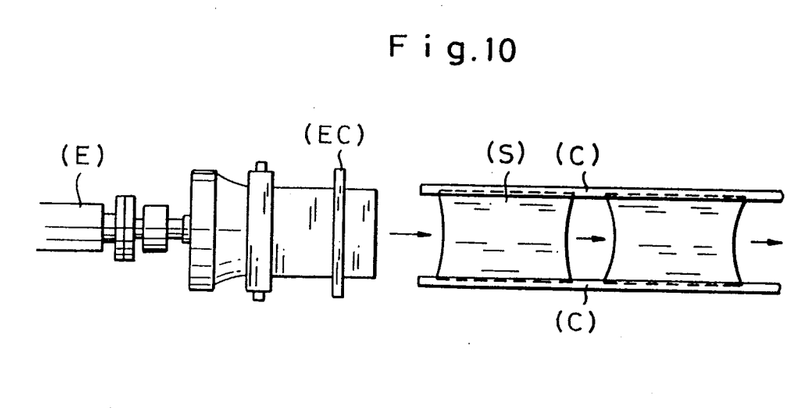

The similar situation is caused also in case where a plurality of plastic sheets (S) are formed and cut by an extruder (E) having a cutter (EC) to be directly fed to the forming zone (F) through the heating zone (H).

Figure 1:
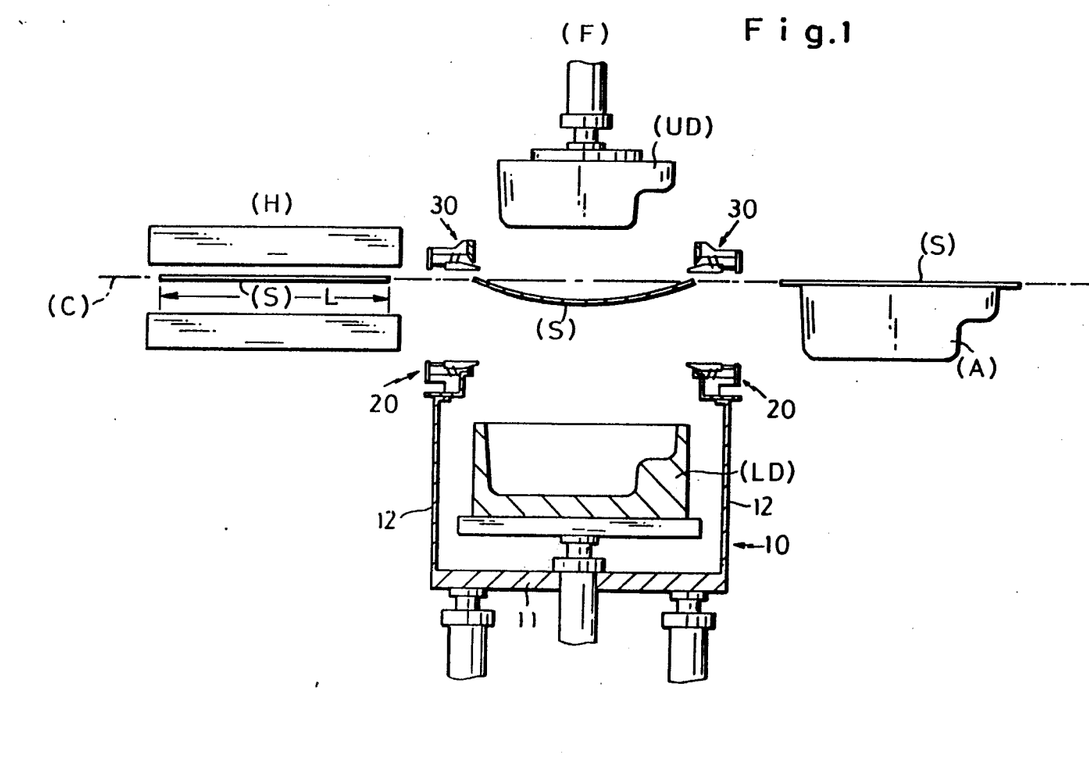
FIG. 1 is a longitudinal section of a forming machine in which the gripping device according to the invention is arranged, shown in the waiting position for receiving a plastic sheet from a heating zone.
Figure 2:
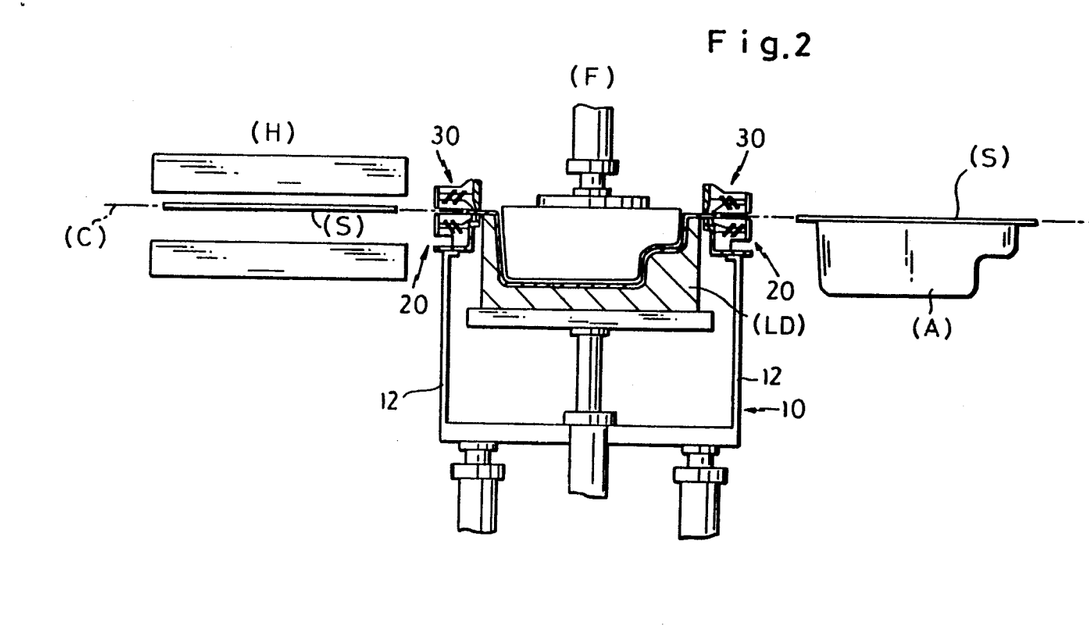
FIG. 2 is a similar view of the gripping device together with the forming machine in the operating position.

Now in reference to FIGS. 1 and 2, the plastic sheets (S) respectively cut in the length (L) are intermittently supplied by the pair of so driven endless cramp chains (C) from the heating zone to the forming zone (F), where an upper die (UD) and a lower die (LD) are separated with each other for the purpose of allowing the plastic sheet (S) to be in position therebetween as shown in FIG. 1 and then engaged together for molding as shown in FIG. 2.

Before molding, the softened and consequently dangled plastic sheet (S) must be gripped by at least two pairs of lower and upper gripping members 20, 20; 30, 30 of the device according to the invention respectively at the front and rear edges so as to be pulled respectively forwards and rearwards so as to be moldingly formed in a desired article (A). As shown in FIG. 2, the molded article is then discharged out of the forming zone (F) when the pair of dies (UD, LD) as well as the pairs of upper and lower gripping members (20, 30) are separated respectively with each other.

For that purpose, the lower die (LD) is adapted to move up and down e.g. by a piston-cylinder device which is not exclusively but preferably mounted on a bottom wall 11 of a vertically movable casing 10, which itself is adapted to move up and down e.g. by another piston-cylinder member. The lower front and rear gripping members 20, 20 are not exclusively but preferably mounted on each of the tops of the front and rear end walls 12, 12 of the casing 10 to face oppositely to the respective counterpart upper front and rear gripping members 30, 30 which are preferably mechanically connected with the lower members 20, 20 so as to be moved up and down in a synchronized manner.

Thus, when another piston-cylinder means is actuated to raise the casing 10, the lower and upper gripping members 20, 30 are engaged with each other so that the plastic sheet (S) is grippingly held thereby at the front and rear edges and concurrently pulled respectively forwards and rearwards according to the invention to be explained in detail hereafter. Then, the lower die (LD) is moved up by actuating said first piston-cylinder means relative to the raised casing 10 to engage with the upper die (UD) synchronistically lowered for molding, which itself is out of the scope of the invention.

Figure 3:
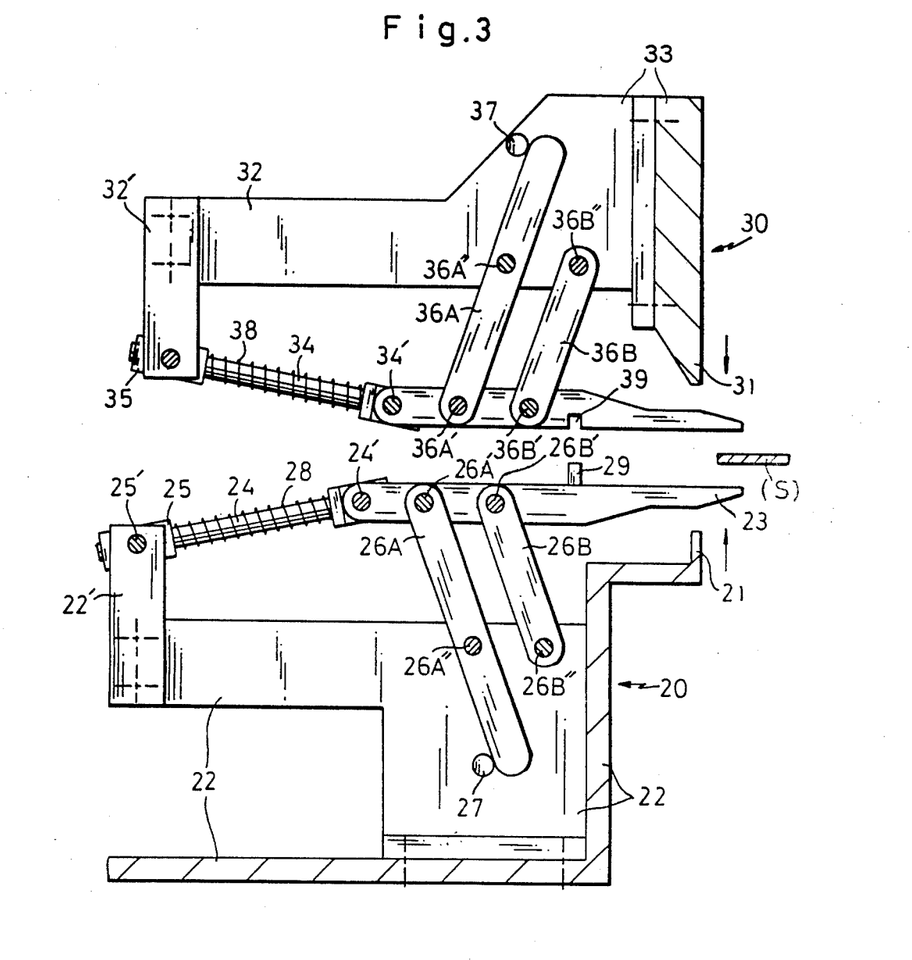
FIG. 3 is a side elevation of a pair of upper and lower gripping members of the device according to the invention partly in section in a larger scale in the waiting position.
Figure 4:
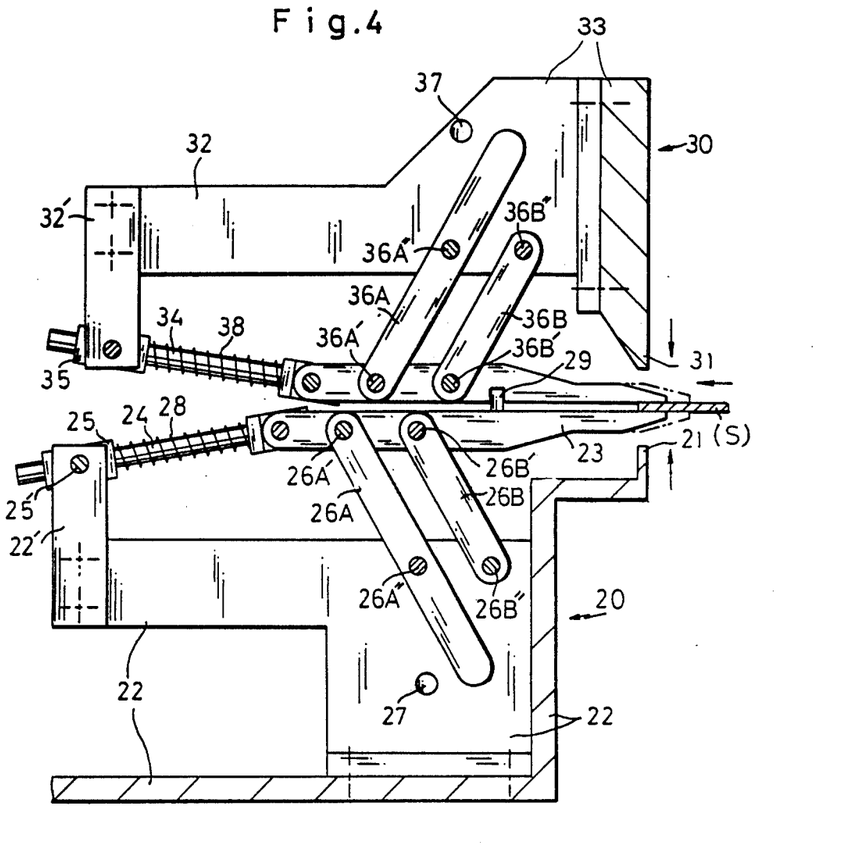
FIG. 4 is a similar view but in the first phase operating position.
Figure 5:
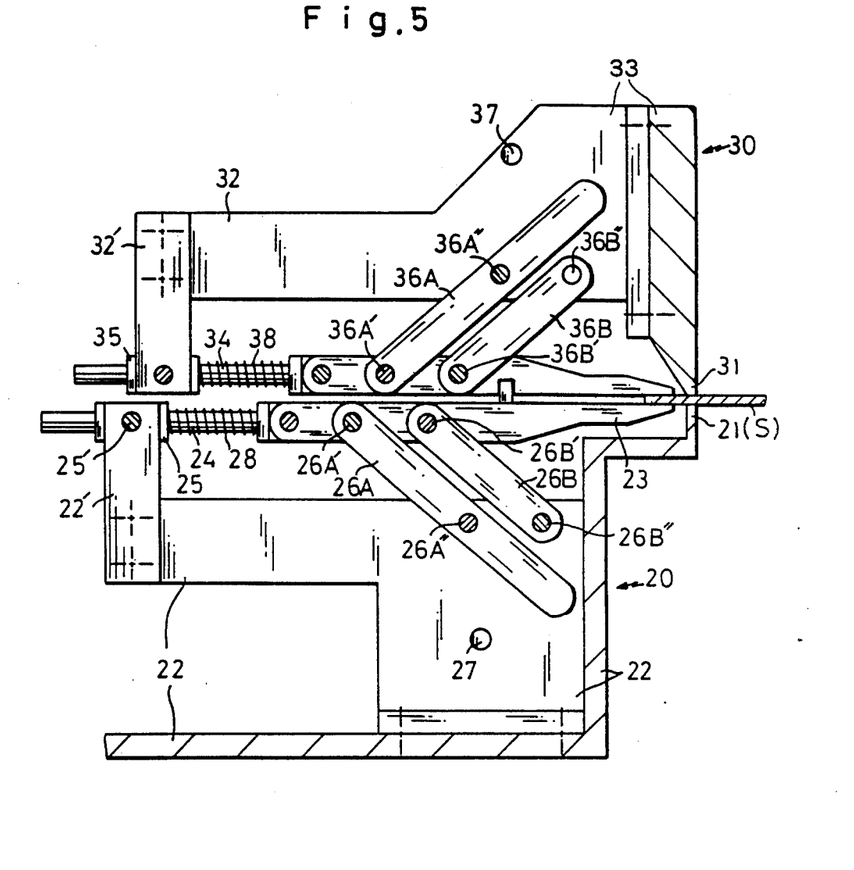
FIG. 5 is a similar view but in the second phase operating position.

In FIGS. 3, 4 and 5, the lower and upper rearward gripping members 20, 30 are illustrated respectively in the waiting, first phase operating and second phase operating positions, which are just same in the construction by symmetrical in arrangement with another pair of gripping members for the front edge of the plastic sheet.

The lower member represented generally by 20 comprises a gripping tip 21 formed on a body portion 22 which is mounted on said casing rear end wall 12 in this embodiment. A pull lever 23 longitudinally extends so that the free end thereof may lie just below the rear edge of the plastic sheet (S) brought in position in the forming zone (F). A pivot lever 24 is pivotally connected 24' at one end with the other end of the pull lever 23. A sleeve 25 through which the pivot lever 24 may slidingly move at the other end portion and which is pivotally mounted on a stud 22' provided on the body portion 22 remote from said gripping tip 21. A pair of longer and shorter parallel link arms 26A, 26B are each pivoted 26A', 26B' at one end with the pull lever 23.

Said link arms 26A, 26B are pivotally mounted 26A", 26B" on the body portion wall 22 respectively at the middle of the former and at the other end of the latter. The other end of the link arm 26A normally abuts on a stopper pin 27 planted on the body portion wall 22 as shown in FIG. 3. A coiled spring 28 is mounted on and along the pivot lever 24 for urging the pull lever 23 pivotally connected therewith so that the free end of said lever 23 is normally exposed beyond the gripping tip 21 to lie below the rear edge of the sheet (S) and the link arm 26A abuts on the pin 27 as referred to above.

Figure 6:
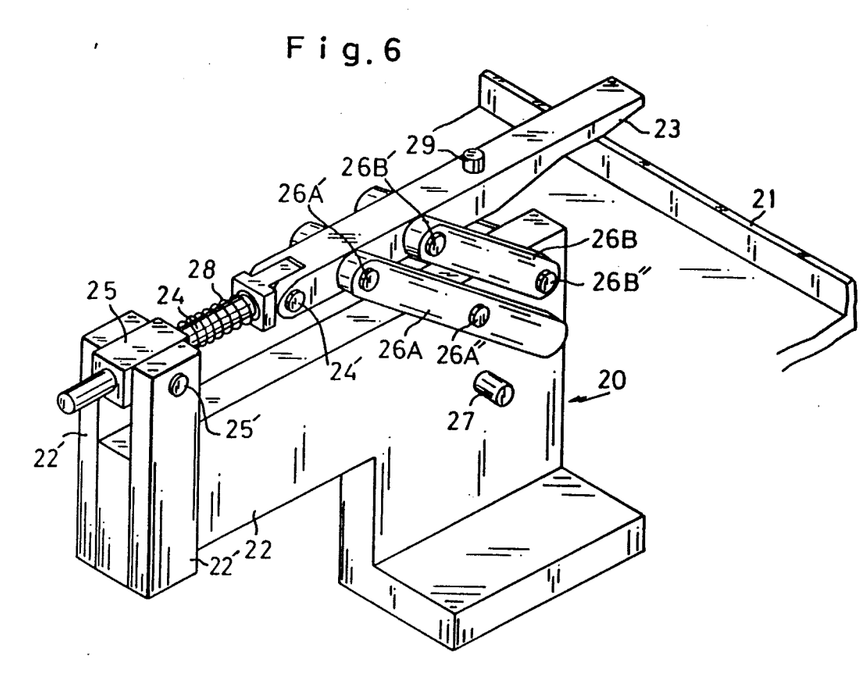
FIG. 6 is a perspective view of the lower one of the pair of gripping members.

As seen from the perspective view of the lower gripping member (FIG. 6), it is preferable to provide a pair of longer link arms 26A and a pair of shorter link arms 26B respectively pivotally mounted on the pull lever 23 and the body portion wall 22 at the both sides thereof for stable movement The upper rear gripping member represented generally by 30, which is substantially the same in construction but symmetrical in arrangement with the lower rear gripping member as referred to above, comprises a gripping tip 31 formed or attached on a body portion 32 which is mechanically connected with the casing 10 so as to be synchronistically lowered when the casing is raised. A pull lever 33 longitudinally extends so that the free end thereof may lie just above the rear edge of the plastic sheet (S) brought in position in the forming zone (F). A pivot lever 34 pivotally connected 34' with the pull lever 33. A sleeve 35 is provided through which the lever 34 is slidingly movable at the other end portion. A pair of longer and shorter parallel link arms 36A, 36B are similarly pivoted 36A', 36B' on the pull lever 33 and pivoted 36A", 36B" on the body portion wall 32. A stopper pin 37 is planted on the wall 32 to normally abut on the free end portion of the link arm 36A. A coiled spring 38 is similarly mounted on and along the pivot lever 33.

The pull levers 33, 23 are formed at the faced sides thereof respectively with a recess 39 and a correspondingly arranged protrusion 29 having a length is a little longer than the depth of said recess 39 so that even when said two levers are engaged with the protrusion fitting in the recess there is left therebetween a gap only a little smaller than the thickness of the sheet (S).

Both gripping members 20 and 30 are arranged and mounted in such a way that the pull levers 23 and 33 are separated with each other for receiving the plastic sheet (S) at the rear edge therebetween and exposed at the free end portion out of an opening formed between the opposite gripping tips 21 and 31.

When the lower gripping member 20 is raised e.g. by actuating another piston cylinder means to raise the casing 10, the upper gripping member 30 is lowered in a synchronized manner as shown by arrows in FIG. 3 respectively against the force of the coiled springs 28, 38 so that the pull levers 23, 33 are engaged together by fitting of the protrusion 29 into the recess 39 to seize the edge of the plastic sheet (S) therebetween at the free end portions. This is shown in phantom lines in FIG. 4.

Further vertical movement of the upper and lower gripping members towards each other compels the parallel link levers 26A, 26B; 36A, 36B to angularly move respectively on the pivots 26A", 26B"; 36A", 36B". This in turn retracts the pull levers 23, 33 engaged together against the force of the coiled springs 28, 38 to be in the respective positions shown by solid lines in FIG. 4 so as to pull the concerned edge of the sheet into the engaged members 20, 30.

Further vertical movement of the upper and lower gripping members towards each other brings engagement of the opposite gripping tips 21, 31 with biting the plastic sheet edge therebetween for ensuring a hold thereof as shown in FIG. 5.

When the article (A) has been moldingly formed, the both dies (LD), (UD) and the at least two pairs of gripping members 20, 30 are vertically moved apart from each other, the gripping tips 21, 31 are separated with each other thereby. The pull levers 23, 33 are separated with each other by means of the springs 28, 38 so as to release the plastic sheet (S) which can be not exhausted out of the forming zone (F).

Figure 7:
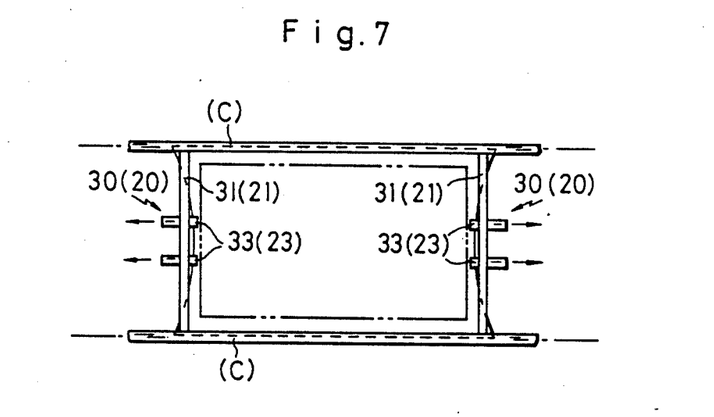
FIG. 7 is a plan view of the thermally softened plastic sheet and two pairs of upper front and rear gripping members in the respective waiting positions.
Figure 8:
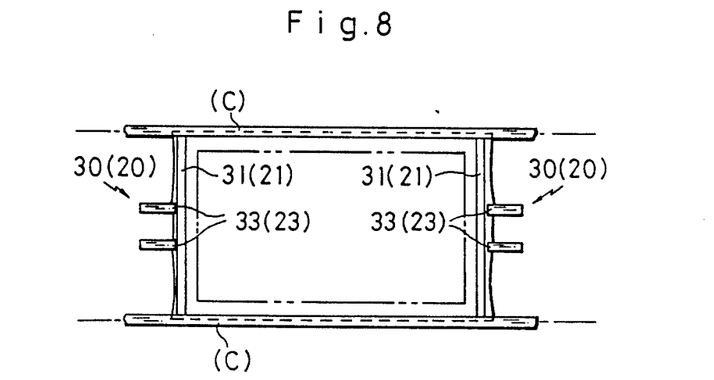
FIG. 8 is a similar view but showing the gripping members in the respective operating positions so that the concave front and rear edges of the plastic sheet shown in FIG. 7 are held and pulled thereby to be substantially straight.

As readily appreciated by glancing at FIGS. 7 and 8, it is preferable to use the device having four pairs of lower and upper gripping members 20, 30, the two pairs of which are for gripping and pulling the front concave edge while the other two pairs are for gripping and pulling the rear concave edge.

What is claimed is:

1. A device for gripping a length of thermally softened and inevitably dangled plastic sheet, said sheet brought in position in a forming machine by feeding means while holding concaved front and rear edges of said plastic sheet to be pulled for straightening, said device comprising; at least two pairs of lower and upper gripping members arranged below and above front and rear edges of said plastic sheet; means for vertically moving each pair of said gripping members towards each other for gripping said plastic sheet and pulling apart from each other for releasing said sheet, each of said pair of gripping members comprising;

a body portion, a gripping tip provided at one end of said body portion, a longitudinally extended pull lever and a longitudinally extended pivot lever pivotally connected with each other, a sleeve pivotally mounted on said body portion at an opposite end thereof and fitted with said pivot lever at said opposite end portion and slidingly movable therein, a pair of parallel link arms pivotally mounted at said one end on said pull lever and said opposite end on said body portion, and spring means mounted on said pivot lever as to urge the pull lever to protrude at a free end portion beyond said gripping tip and each of said pair of gripping members being arranged symmetrical with respect to each other so that opposite gripping tips are normally separated to form an opening therebetween through which said pull levers normally separated are protruded and so that when said means for vertically moving moves said pair of gripping members towards each other said pull levers are firstly engaged to grip an edge of the plastic sheet therebetween at the free end portion and concurrently retracted against a force of said spring means for pulling to straighten the concaved edge and then the gripping tips are engaged to further grip the edge of the plastic sheet.

2. The device as set forth in claim 1, which comprises four pairs of lower and upper gripping members, two pairs of which are for the front edge of the plastic sheet while the other two pairs are for the rear edge thereof.

3. The device as set force in claim 1, in which said pull levers are provided with a protrusion and a corresponding recess so that when the pair of gripping members are vertically moved towards each other said protrusion is fitted in said recess so as to prevent said two pull levers from relatively moving with each other in the longitudinal direction and leave a gap therebetween for gripping the concerned sheet edge therebetween.

4. The device as set forth in claim 1, in which said spring means is a coiled spring mounted around and along said pivot lever.

5. The device as set forth in claim 4, in which a stopper pin is planted on the body portion so as to abut one of said link arms for opposing the urging force of said coiled spring.

6. The device as set forth in claim 1, which comprises two pairs of parallel link arms pivotally mounted on said pull lever at opposite side walls thereof.

* * * * *